United States Patent
Aoshima et al.

(10) Patent No.: US 6,874,759 B2
(45) Date of Patent: Apr. 5, 2005

(54) PLUG VALVE

(75) Inventors: Hiroaki Aoshima, Kitakatsushika-gun (JP); Takashi Tozaki, Koshigaya (JP)

(73) Assignee: SMC Kabushiki Kaisha, Tokyo (JP)

( * ) Notice: Subject to any disclaimer, the term of this patent is extended or adjusted under 35 U.S.C. 154(b) by 169 days.

(21) Appl. No.: 10/292,473

(22) Filed: Nov. 13, 2002

(65) Prior Publication Data

US 2004/0089834 A1 May 13, 2004

(51) Int. Cl.[7] .............................................. F16K 43/00
(52) U.S. Cl. ...................... 251/309; 251/900; 251/904
(58) Field of Search ................. 251/309–312, 251/900, 904

(56) References Cited

U.S. PATENT DOCUMENTS 4,890,817 A * 1/1990 Uri ............................ 251/312
5,188,144 A    2/1993 Radossi
5,327,929 A    7/1994 Radossi

FOREIGN PATENT DOCUMENTS

JP    5-215250    8/1993

* cited by examiner

Primary Examiner—J. Casimer Jacyna
(74) Attorney, Agent, or Firm—Paul A. Guss (57) ABSTRACT

A main valve body has a first passage, a second passage, and an opening which intersects the first passage and the second passage. A main plug body is rotatably inserted into the opening, and has an upper section into which a handle is inserted, and a lower section having a through-hole. An O-ring is seated on an annular groove which is provided in the vicinity of the through-hole. A seal-retaining member for preventing the O-ring from projecting is fitted to an expanded diameter section of the first passage. One end of the seal-retaining member tightly contacts an end surface of the expanded diameter section. A curved surface corresponding to an inner circumferential surface of the opening is formed at the other end of the seal-retaining member.

13 Claims, 10 Drawing Sheets

PLUG VALVE

BACKGROUND OF THE INVENTION

1. Field of the Invention

The present invention relates to a plug valve which a fluid flows through or is interrupted by. The plug valve is capable of reliably preventing the fluid from leakage during the interruption.

2. Description of the Related Art

Conventionally, a plug valve comprises a main valve body and a plug. The valve body is provided with a first passage and a second passage having their axes coincident with each other, and includes a columnar opening disposed between the first passage and the second passage. The plug is rotatably attached to the opening.

The plug valve has a through-hole penetrating therethrough in a direction substantially coincident with the axial direction of the first and second passages. Accordingly, the plug is constructed such that the fluid flows from the first passage through the through-hole to the second passage.

The plug is rotatable from a communication position at which the through-hole provided in the opening of the main valve body communicates with the first passage and the second passage, to an interruption position at which the fluid is prevented from flowing from the first passage to the second passage. In this arrangement, a seal member is provided on the periphery of the through-hole of the plug. The seal member constitutes a seal mechanism which prevents the fluid from flowing from the first passage to the second passage when the plug is rotated from the communication position to the interruption position (see, for example, Japanese Laid-Open Patent Publication No. 5-215250).

However, when the seal member crosses the first passage in the rotation of the plug, the seal member projects or floats over the seal groove due to the difference in pressure of the fluid between the first passage and the second passage. If the plug is rotated while the seal member projects, the seal member is caught between the end surface of the hole of the first passage and the end surface of the seal groove. When the seal member is damaged, the fluid leaks and sufficient seal function is not effected.

SUMMARY OF THE INVENTION

A general object of the present invention is to provide a plug valve which makes it possible to prevent a seal member from projecting from a seal groove by using a seal-retaining member in a main valve body.

According to the present invention, a seal member can be prevented from projecting by a seal-retaining member provided in a first passage when the seal member crosses an opening end surface of the first passage in opening/closing the connection between a main valve body and a plug member having the seal member. Accordingly, the seal member is prevented from being caught or disposed between the opening end surface of the first passage and the end surface of the seal groove. Thus, it is possible to avoid any leakage of the fluid which would be otherwise caused by the damage of the seal member.

Therefore, maintenance operation of the fluid-operated apparatus can be reduced, and the cost required for the maintenance and the management can also be reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
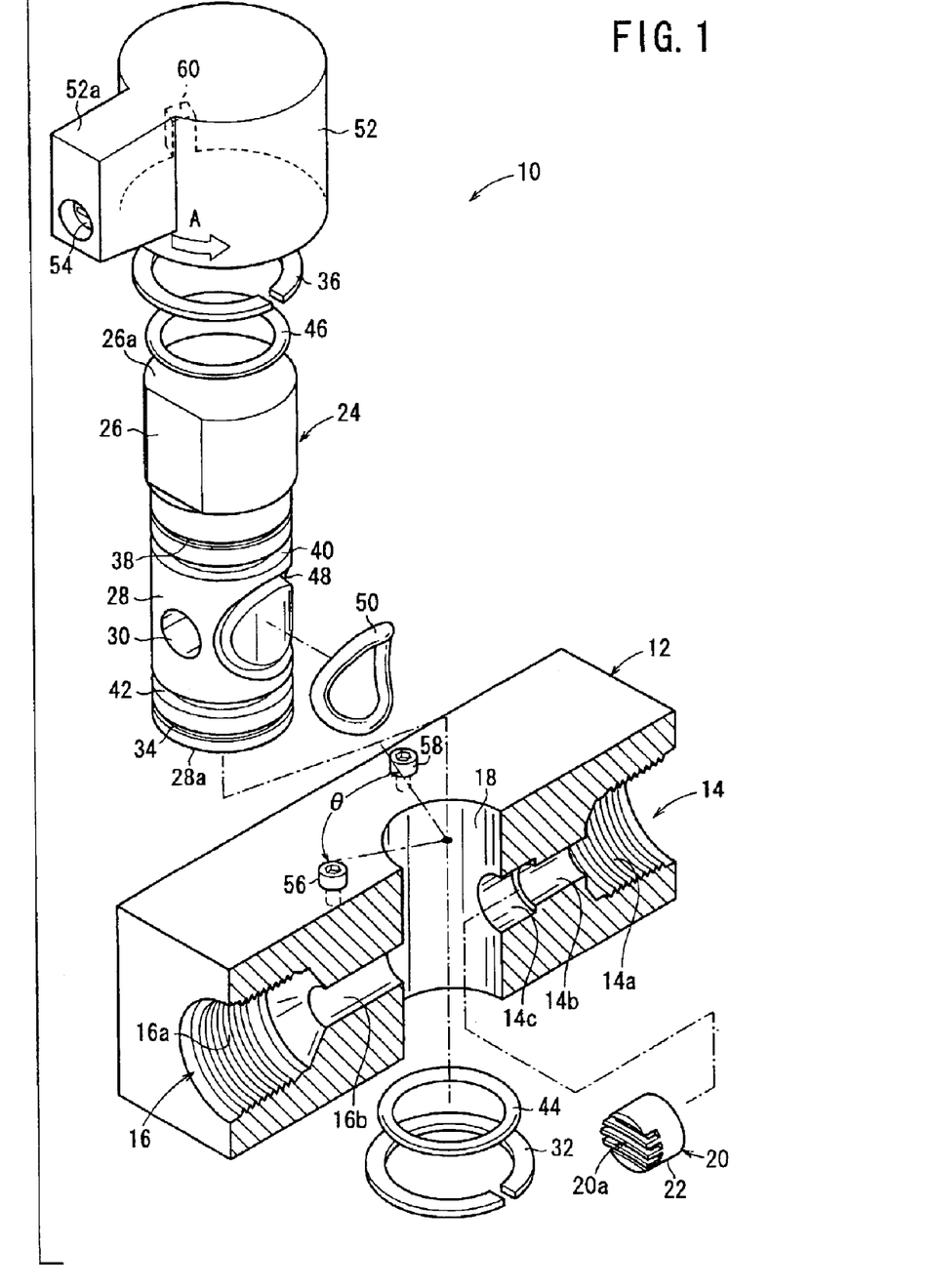
FIG. 1 is, with partial cross section, an exploded perspective view illustrating a schematic structure of a plug valve according to an embodiment of the present invention.

FIG. 1 is an exploded perspective view illustrating a schematic arrangement of a plug valve 10 according to an embodiment of the present invention.

With reference to FIG. 1, a rectangular main valve body 12 is provided with a first passage 14, a second passage 16, and an opening 18. The axes of the first passage 14 and the second passage 16 are coincident with each other. The opening 18 has a cylindrical inner circumferential surface intersecting substantially perpendicularly with respect to the first passage 14 and the second passage 16.

The first passage 14 includes a screw hole 14a with which an unillustrated joint is screwed, a reduced diameter section 14b which communicates with the screw hole 14a, and an expanded diameter section 14c which communicates with the reduced diameter section 14b and the opening 18.

The second passage 16 includes a screw hole 16a with which an unillustrated joint is screwed and a reduced diameter section 16b which communicates with the screw hole 16a and the opening 18.

A seal-retaining member 20 made of, for example, resin is fitted to the expanded diameter section 14c in order to prevent an O-ring (seal member) 50 from projecting. In this arrangement, as shown in FIG. 1, the seal-retaining member 20 is attached to the expanded diameter section 14c from the inside of the main valve body 12, i.e., from the inside of the opening 18.

Figure 2:
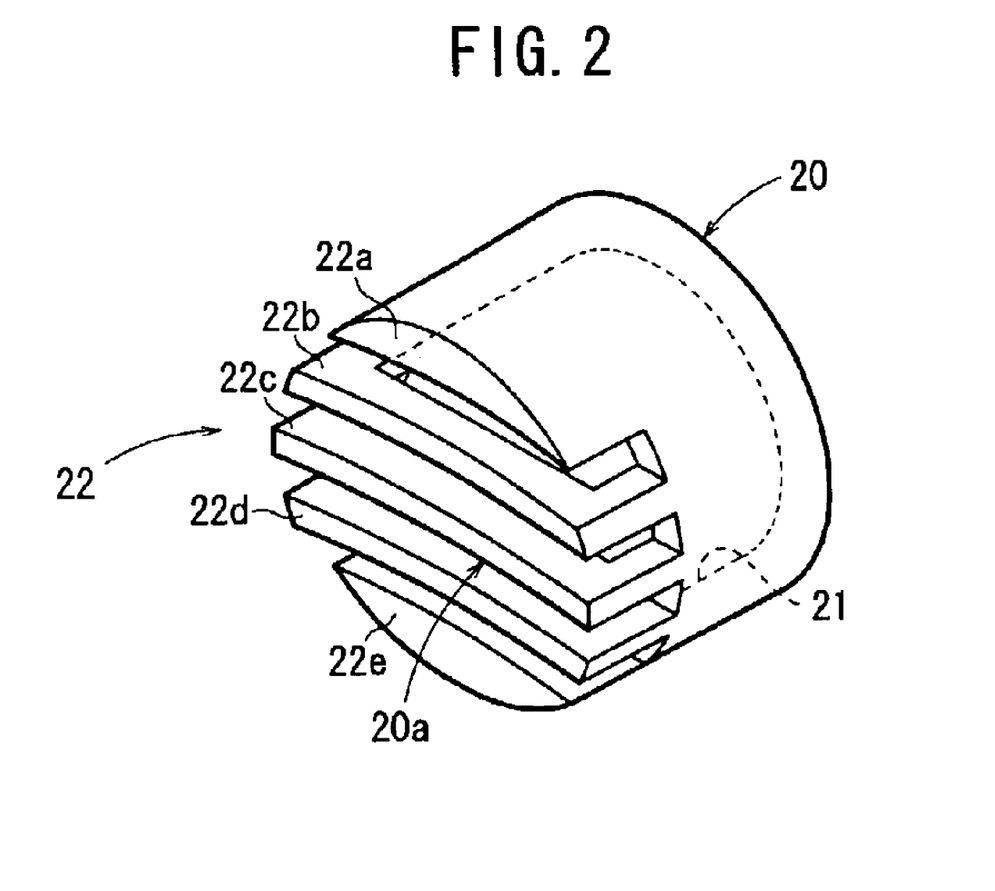
FIG. 2 is a perspective view illustrating a seal-retaining member of the plug valve shown in FIG. 1.

As shown in FIG. 2, an annular flat surface section is formed at one end of the seal-retaining member 20. The seal-retaining member 20 has a cylindrical shape and is provided with a passage 21 so that the flat surface section tightly contacts a step between the expanded diameter section 14c and the reduced diameter section 14b. A curved surface 20a is formed at the other end of the seal-retaining member 20 and follows the curved inner circumferential surface of the opening 18. A plurality of slits 22 are formed in the curved surface 20a. The slits 22 have a plurality of thin partitions 22a to 22e extending in the axial direction. In place of the slits 22, a plurality of holes in the axial direction may be provided in the curved surface 20a.

It is desirable that the seal-retaining member 20 is attached to the expanded diameter section 14c so that the slits 22 are disposed in the direction substantially perpendicular to the axial direction of the main plug body 24. The reason is that it is easy for the O-ring 50 to move over the edge between the first passage 14 and the opening 18 since the O-ring 50 slides along the curved surface 20a of the slits 22 during the rotation of the main plug body 24. Thus, it is possible to prevent the O-ring 50 from any damage.

The main plug body (plug member) 24, which is rotatably inserted into the opening 18, includes an upper section 26 and a lower section 28. A handle 52 is inserted and fitted into the upper section 26. A through-hole (communication hole) 30 is formed through a substantially central portion of the lower section 28, which is disposed substantially perpendicularly to the axial direction. The main plug body 24 includes an upper surface 26a and a bottom surface 28a which are flat.

An annular groove 34 is provided in the vicinity of the bottom surface 28a of the main plug body 24. The annular groove 34 is disposed adjacently to the bottom surface 28a and a substantially C-shaped holding member 32 is fitted to the annular groove 34. Further, an annular groove 38 is provided between the upper section 26 and the lower section 28. A substantially C-shaped holding member 36 is fitted to the annular groove 38.

Accordingly, when the two holding members 32, 36 are seated on the annular grooves 34, 38, the main plug body 24 is reliably attached to the opening 18 of the main valve body 12, and does not move in the axial direction.

A pair of annular grooves 40, 42 are formed in the circumferential direction on the lower section 28. The annular grooves 40, 42 are disposed away from the through-hole 30 by the same distance. O-rings 44, 46 serving as seal members are seated on the annular grooves 40, 42, respectively. The O-rings 44, 46 function as the seal mechanism together with the inner circumferential surface of the opening 18 of the main valve body 12 to prevent the fluid from any leakage.

An annular groove 48 is provided on the outer circumferential surface of the lower section 28 which is disposed in the vicinity of the through-hole 30. An O-ring 50 serving as a seal member is seated on the annular groove 48. The O-ring 50 is compressed between the annular groove 48 and the inner circumferential surface of the opening 18 of the main valve body 12 for sealing so that the fluid is prevented from any leakage. In FIG. 1, it is supposed that the O-ring 50 is removed from the annular groove 48 while compressed between the annular groove 48 and the inner circumferential surface of the opening 18 of the main valve body 12. However, it is a matter of course that the O-ring 50 has a regular circular shape in the free state in the same manner as the O-rings 44, 46.

The handle 52 is inserted and fitted into the upper surface 26a of the upper section 26. The handle 52 has a protruding end 52a which is secured to the upper section 26 by means of a screw member 54 in the axial direction of the through-hole 30. The handle 52 is provided with a stopper 60 for abutting against screw members 56, 58, so that the angle of rotation θ of the main plug body 24 is regulated, for example, to about 90°.

The plug valve 10 according to the embodiment of the present invention is basically constructed as described above. Next, its operation, function, and effect will be explained.

Figure 3:
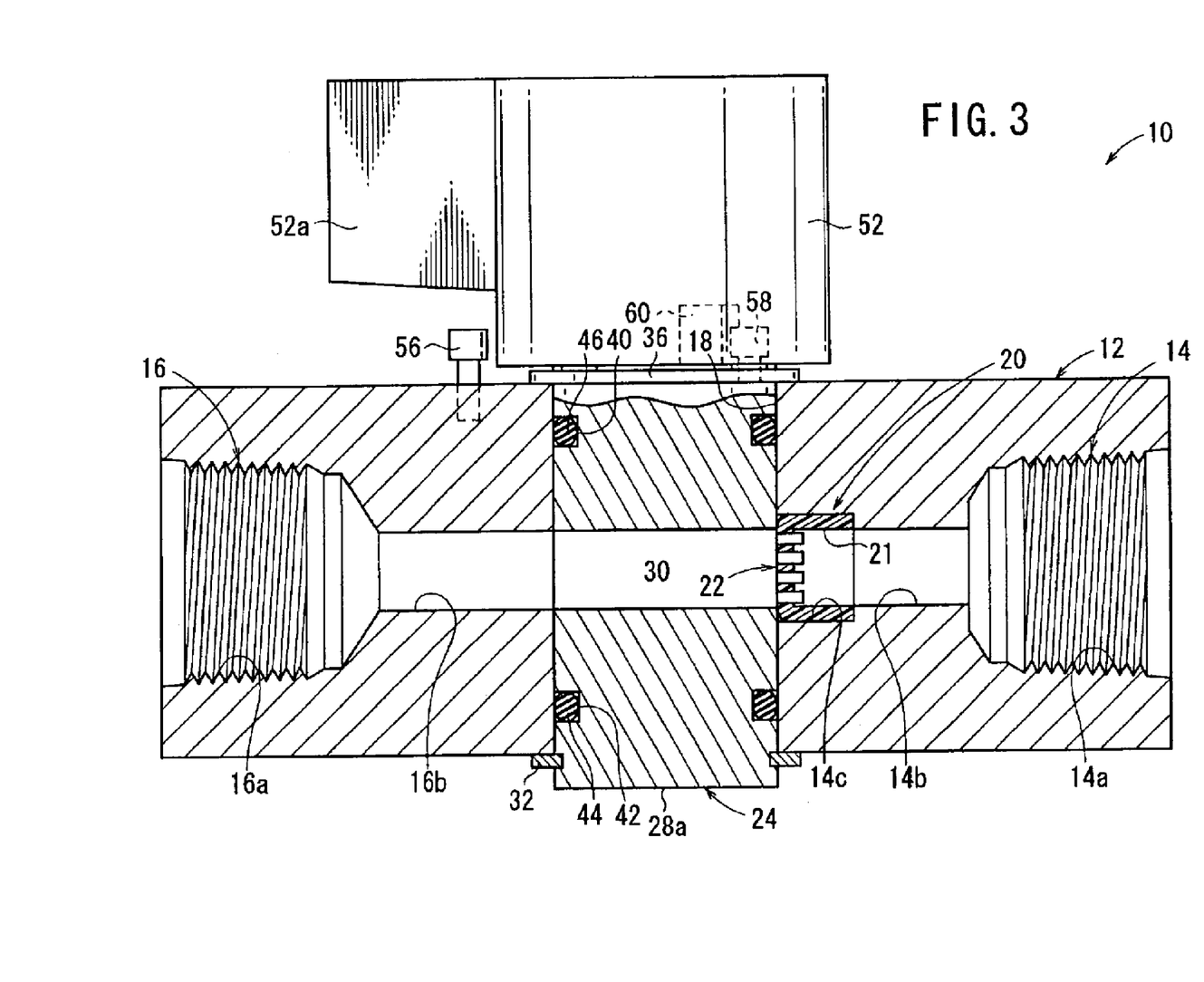
FIG. 3 is a partial longitudinal sectional view illustrating a state in which a first passage and a second passage of a main valve body of the plug valve shown in FIG. 1 are communicated with each other.

FIG. 3 shows that the through-hole 30 communicates with the first passage 14 and the second passage 16.

With reference to FIG. 3, the O-rings 44, 46 are seated on the inner circumferential surface and the annular grooves 40, 42 to prevent the fluid from any leakage between the inner circumferential surface of the opening 18 and the outer circumferential surface of the main plug body 24. In this situation, the stopper 60 abuts against the screw member 58. The first passage 14, the second passage 16, and the through-hole 30 are positioned on substantially the same axis.

Therefore, the fluid coming into the first passage 14 passes through the passage 21 and the slits 22 of the seal-retaining member 20, and the fluid flows via the through-hole 30 to the second passage 16.

Figure 4:
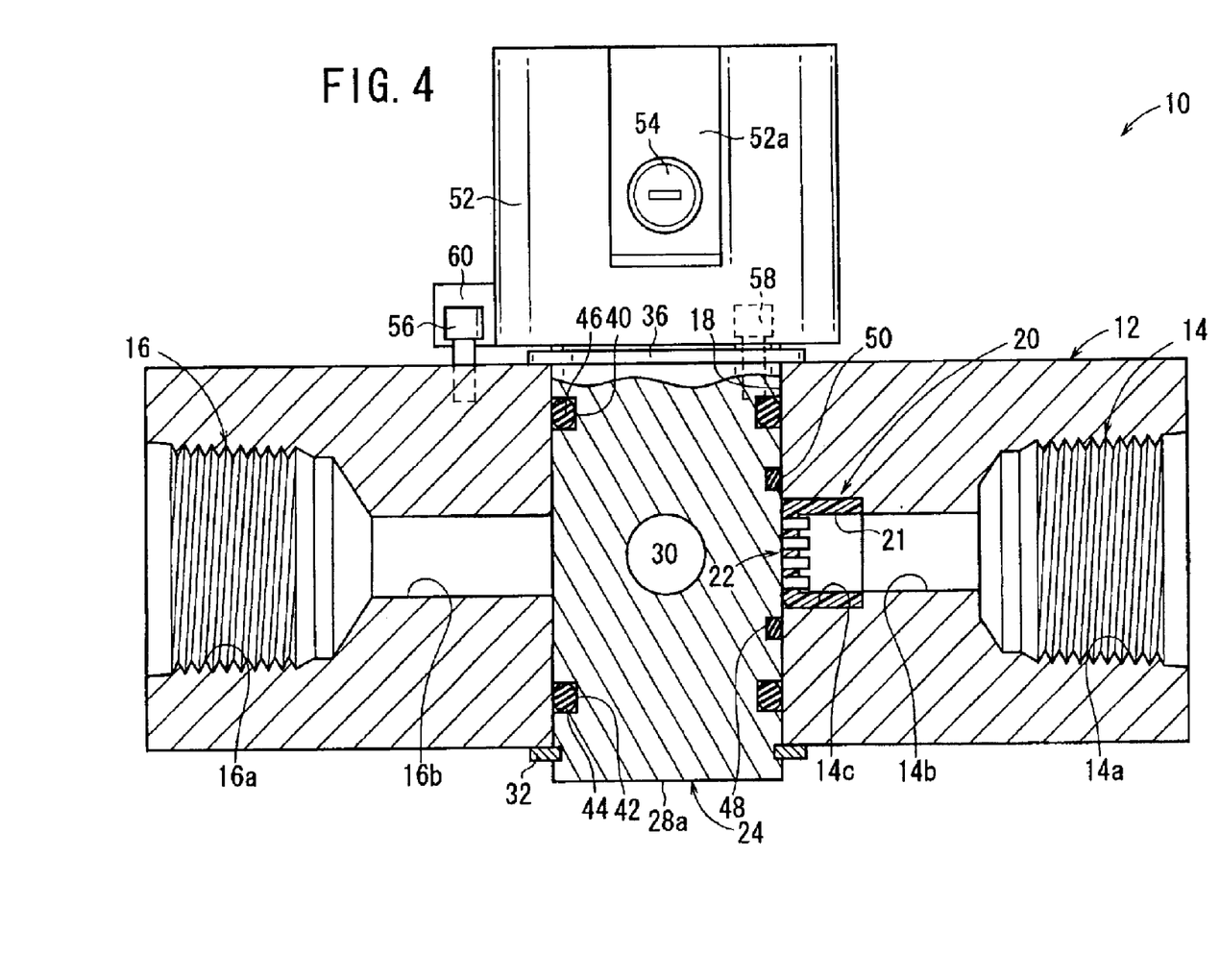
FIG. 4 is a partial longitudinal sectional view illustrating a state in which the communication is interrupted between the first passage and the second passage of the main valve body of the plug valve shown in FIG. 1.

FIG. 4 shows that the handle 52 is rotated in the direction of the arrow A (see FIG. 1), the stopper 60 abuts against the screw member 56, and the first passage 14 and the second passage 16 are interrupted by the main plug body 24. That is, the O-ring 50 is seated between the annular groove 48 and the inner circumferential surface of the opening 18, so that the fluid coming from the first passage 14 is successfully prevented from any leakage.

Figure 5:
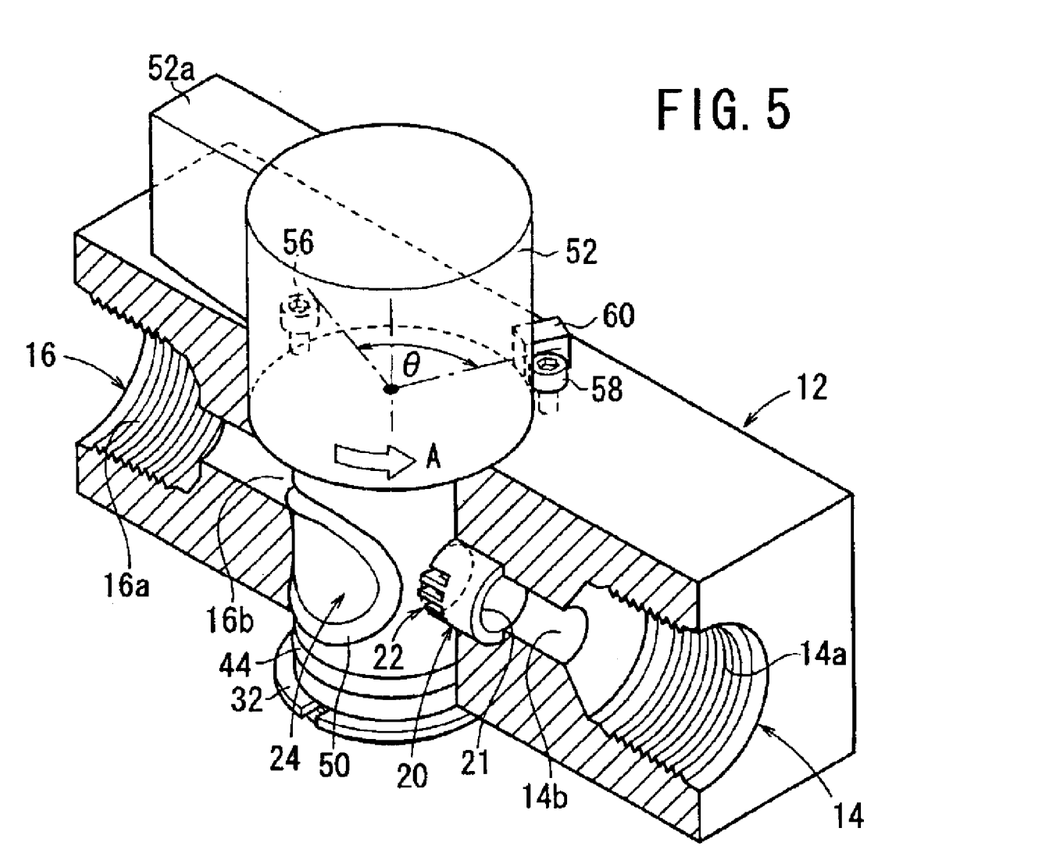
FIG. 5 is, with partial cross section, a perspective view illustrating the relationship between the main plug body and the seal-retaining member in the state in which the first passage communicates with the second passage.
Figure 6:
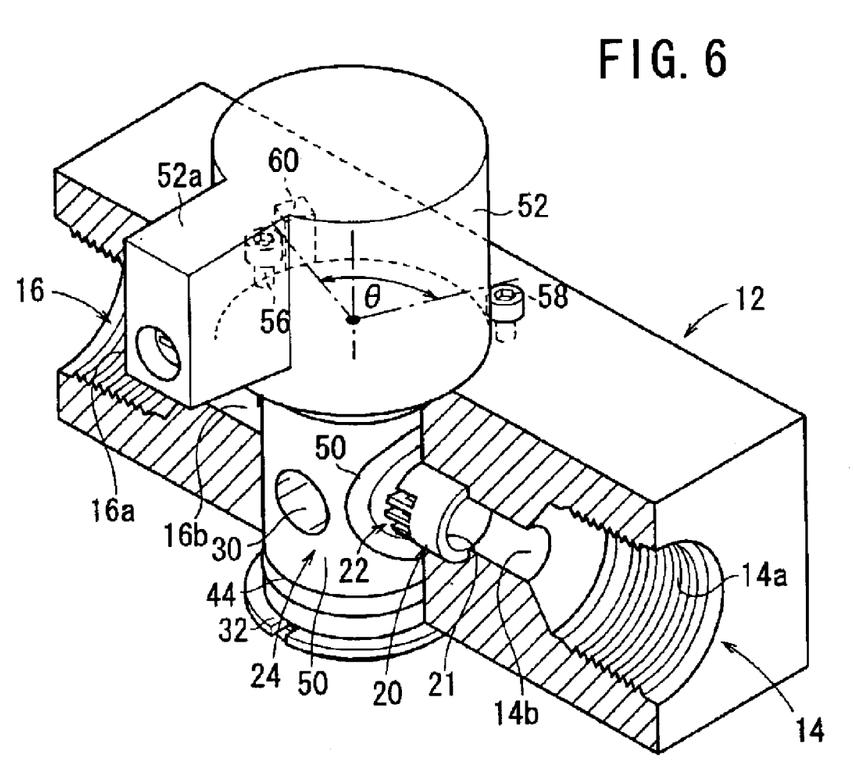
FIG. 6 is, with partial cross section, a perspective view illustrating the relationship between the main plug body and the seal-retaining member in the state in which the communication is interrupted between the first passage and the second passage.

In the plug valve 10 according to the embodiment of the present invention, as shown in FIGS. 5 and 6, when the handle 52 is rotated between the screw members 56, 58, the O-ring 50 attached to the annular groove 48 moves along the end surface of the hole of the first passage 14. At that time, even if the O-ring 50 projects from the annular groove 48 due to the difference in pressure of the fluid between the first passage 14 and the second passage 16, the O-ring 50 is pressed by the slits 22 to prevent the O-ring 50 from projecting.

Therefore, the O-ring 50 is prevented from being caught between the end surface of the hole of the first passage 14 and the end surface of the annular groove 48. Thus, it is possible to avoid any leakage of the fluid from the first passage 14.

In the plug valve 10 according to the embodiment of the present invention, the first passage 14 and the second passage 16 are used as the fluid inlet and the fluid outlet, respectively. However, it is also possible to use the first passage 14 and the second passage 16 as the fluid outlet and the fluid inlet, respectively.

Figure 7:
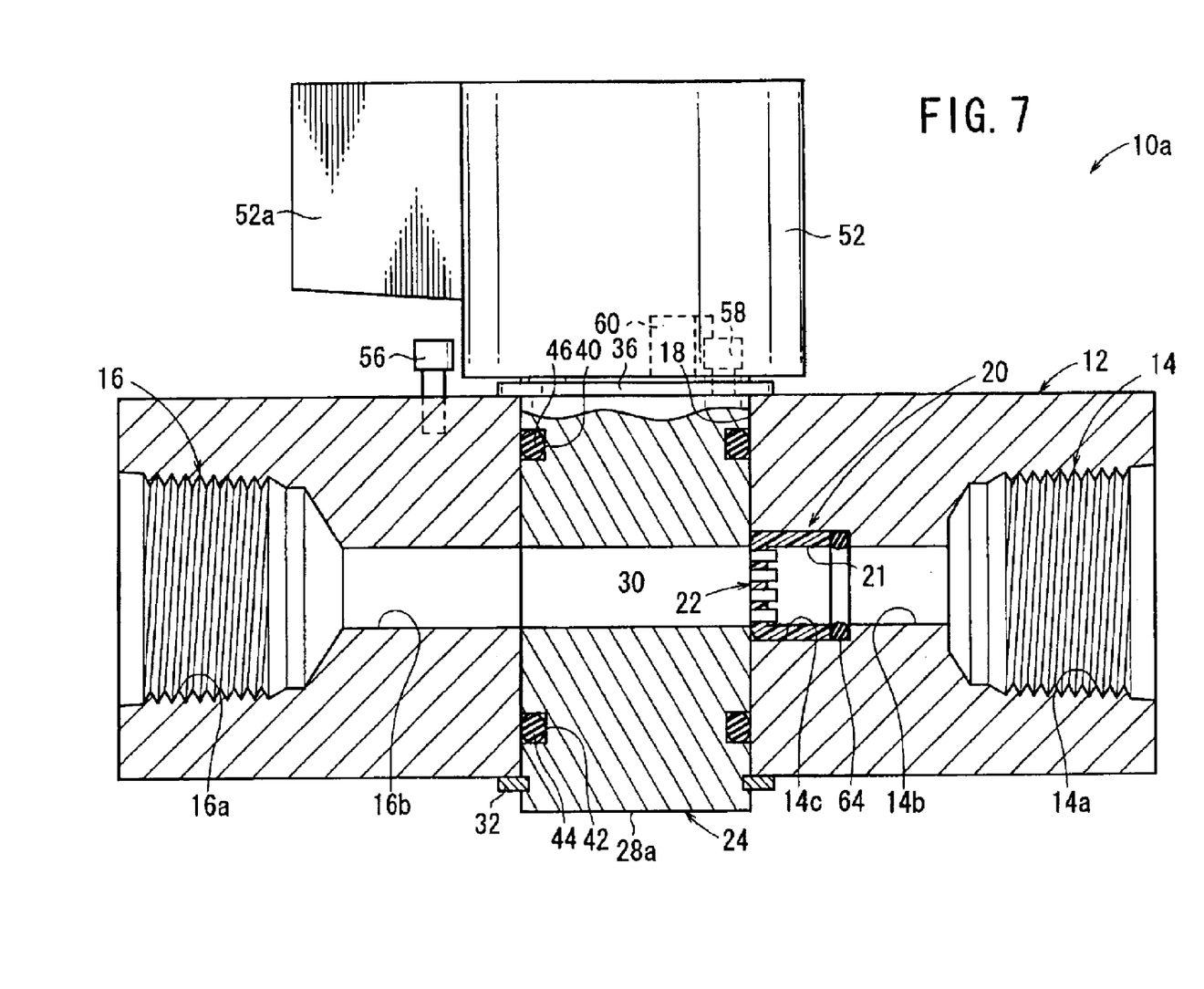
FIG. 7 is a partial longitudinal sectional view illustrating the relationship between a seal-retaining member and a buffer member of a plug valve according to a second embodiment.

FIG. 7 shows a schematic structure of a plug valve 10a according to a second embodiment.

In FIG. 7, the components that are the same as the components of the plug valve 10 shown in FIG. 1 are designated by the same reference numeral, detailed explanation thereof will be omitted. The further following embodiments will be described in the same manner as described above.

In FIG. 7, an annular buffer member 64 is provided at the back of the seal-retaining member 20 (on the side of the first passage 14). The buffer member 64 absorbs any dimensional change brought about by the difference in temperature and contacts the main plug body 24 with an appropriate force, so that the O-ring 50 is prevented from excessively pressing by the main plug body 24.

Figure 8:
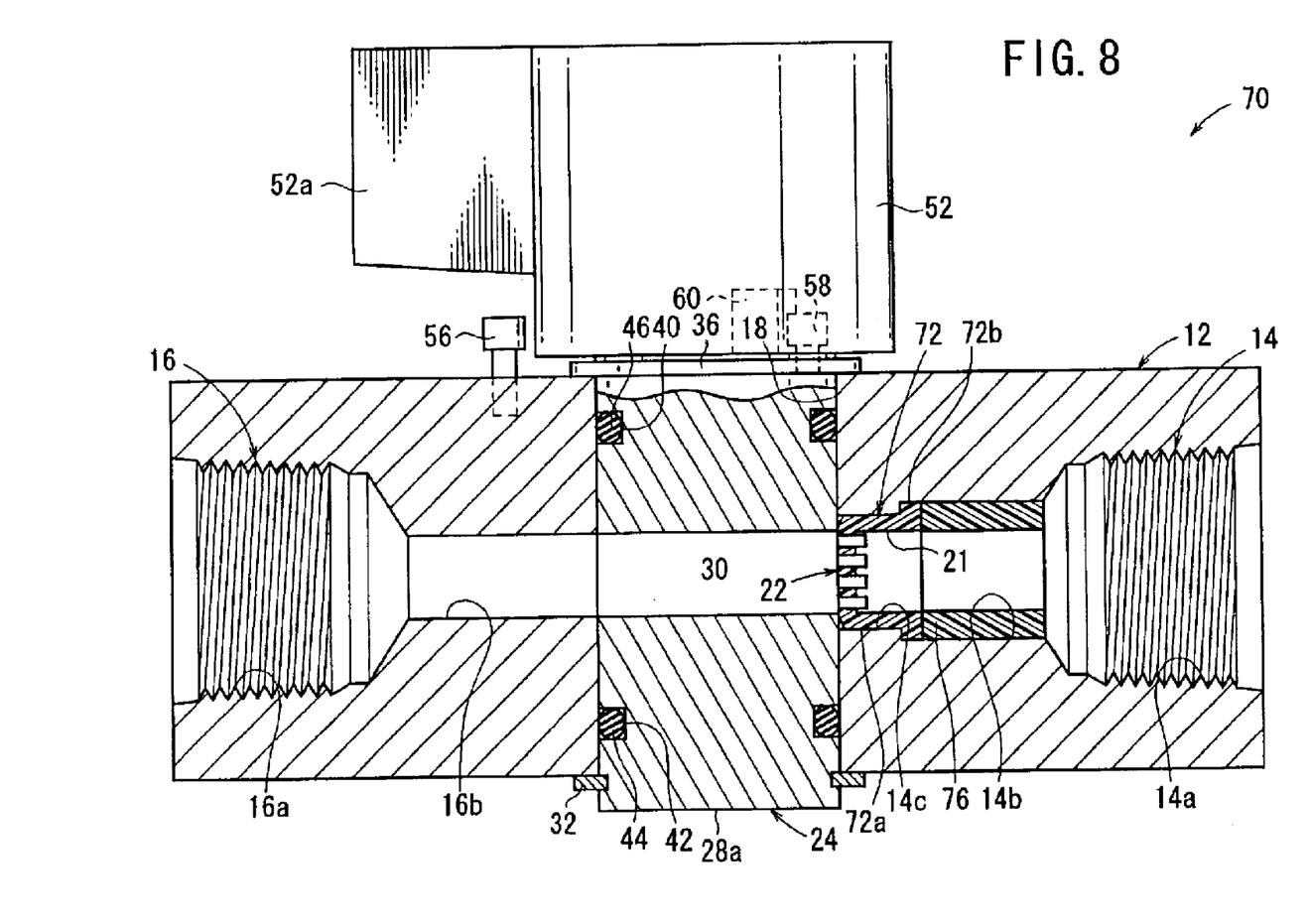
FIG. 8 is a partial longitudinal sectional view illustrating the relationship between a seal-retaining member and a spacer of a plug valve according to a third embodiment.

FIG. 8 shows a schematic structure of a plug valve 70 according to a third embodiment.

Figure 10:
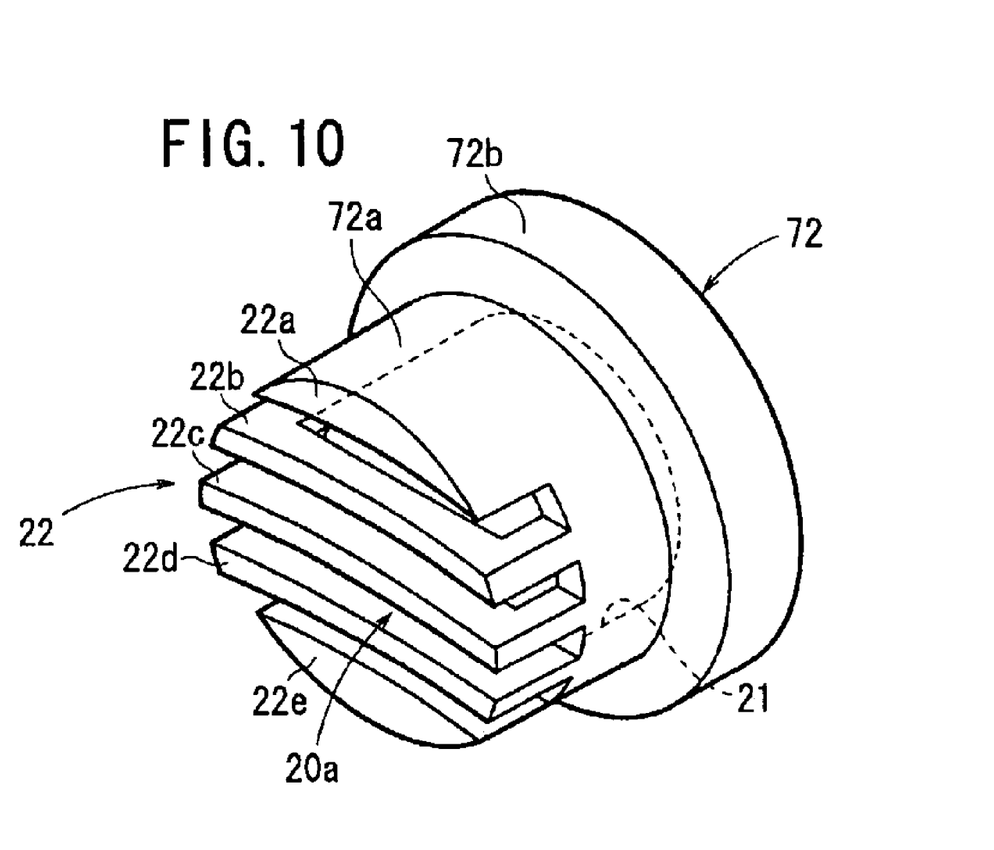
FIG. 10 is a perspective view illustrating the seal-retaining member of the plug valve shown in FIG. 8.

As shown in FIG. 10, a seal-retaining member 72 made of resin includes a cylindrical section 72a and a flange 72b. The cylindrical section 72a is fitted to the reduced diameter section 14b, and the flange 72b is engaged with the expanded diameter section 14c.

The flange 72b of the seal-retaining member 72 abuts against an end surface of a spacer 76 made of resin which is fitted to the expanded diameter section 14c. The seal-retaining member 72 is attached to the reduced diameter section 14b. As shown in FIG. 8, the seal-retaining member 72 and the spacer 76 are pressed, for example, by forcible insertion or screw engagement of the spacer 76 or an unillustrated joint which is attached from the outside of the main valve body 12, i.e., into the screw hole 14a and which is screwed with the screw hole 14a.

In the plug valve 70 according to the third embodiment, the seal-retaining member 72 is pressed by the spacer 76 so that the O-ring 50 (see FIG. 1) is prevented from projecting during the rotation of the handle 52.

Figure 9:
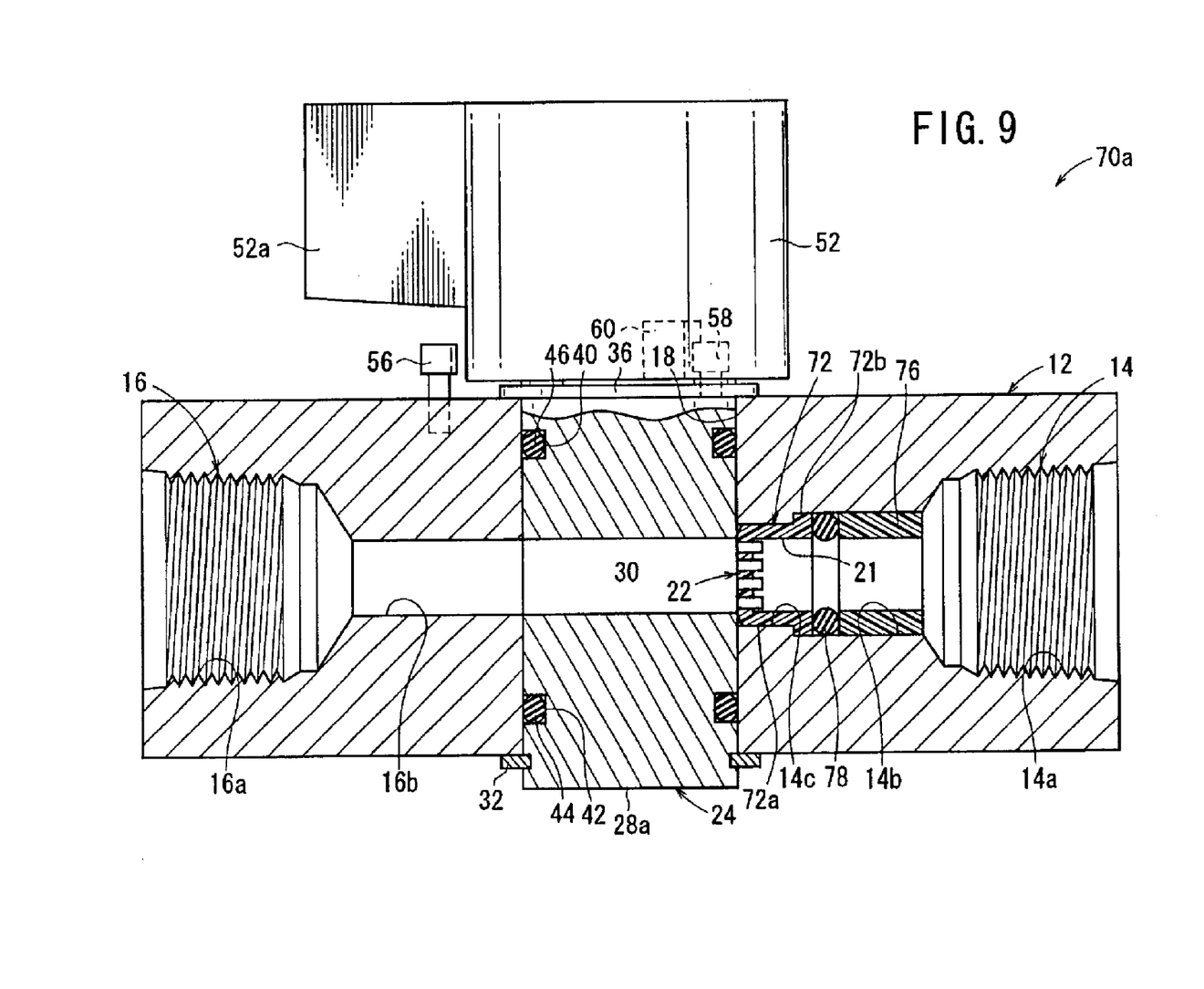
FIG. 9 is a partial longitudinal sectional view illustrating the relationship among a seal-retaining member, a spacer, and a buffer member of a plug valve according to a fourth embodiment.

FIG. 9 shows a schematic structure of a plug valve 70a according to a fourth embodiment.

In FIG. 9, an annular buffer member 78, which has a large diameter in cross section, is interposed between the seal-retaining member 72 and the spacer 76, and the spacer 76 presses the buffer member 78 to prevent the O-ring 50 (see FIG. 1) from projecting.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A plug valve comprising:
   a main valve body having a first passage, a second passage, and a first opening intersecting said first passage and said second passage, said first opening having a cylindrical surface;
   a plug member provided with a communication hole for communicating with said first passage and said second passage, said plug member being rotatable between a communication position for connecting said communication hole to said first passage and said second passage and an interruption position for interrupting communication between said first passage and said second passage;
   a seal member provided on said plug member for surrounding an opening end of said communication hole; and
   a seal-retaining member provided in said first passage and having a second opening, wherein slits or holes communicating with said first opening are provided in said seal-retaining member, said seal-retaining member having a cylindrically curved surface corresponding to said cylindrical surface of said first opening and conforming to an outer circumferential surface of said plug member,
   wherein said seal member is prevented from projecting by said seal-retaining member when said plug member rotates and said seal member crosses said first passage.

2. The plug valve according to claim 1, wherein said seal-retaining member is disposed so that said slits or holes are arranged in a direction substantially perpendicular to an axial direction of said plug member.

3. The plug valve according to claim 1, wherein said seal-retaining member is arranged together with a buffer member.

4. The plug valve according to claim 1, wherein said seal-retaining member is arranged together with a spacer.

5. The plug valve according to claim 1, wherein said seal-retaining member comprises a spacer and a buffer member provided between said spacer and said seal-retaining member.

6. A plug valve comprising:
   a main valve body having a first passage, a second passage, and a first opening intersecting said first passage and said second passage;
   a plug member provided with a communication hole for communicating with said first passage and said second passage, said plug member being rotatable between a communication position for connecting said communication hole to said first passage and said second passage and an interruption position for interrupting communication between said first passage and said second passage;
   a seal member provided on said plug member for surrounding an opening end of said communication hole; and
   a seal-retaining member provided in said first passage and having a second opening, at least a part of said seal-retaining member conforming to an outer circumferential surface of said plug member,
   wherein said seal-retaining member is arranged together with a buffer member, and
   wherein said seal member is prevented from projecting by said seal-retaining member when said plug member rotates and said seal member crosses said first passage.

7. The plug valve according to claim 6, wherein slits or holes for communicating with said first opening are provided in said seal-retaining member.

8. The plug valve according to claim 7, wherein said slits or said holes are provided in a curved surface of said seal-retaining member conforming to said outer circumferential surface of said plug member.

9. The plug valve according to claim 7, wherein said seal-retaining member is disposed so that said slits or holes are arranged in a direction substantially perpendicular to an axial direction of said plug member.

10. A plug valve comprising:
    a main valve body having a first passage, a second passage, and a first opening intersecting said first passage and said second passage;
    a plug member provided with a communication hole for communicating with said first passage and said second passage, said plug member being rotatable between a communication position for connecting said communication hole to said first passage and said second passage and an interruption position for interrupting communication between said first passage and said second passage, a seal member provided on said plug member for surrounding an opening end of said communication hole; and a seal-retaining member provided in said first passage and having a second opening, at least a part of said seal-retaining member conforming to an outer circumferential surface of said plug member, wherein said seal-retaining member comprises a spacer and a buffer member provided between said spacer and said seal-retaining member, and wherein said seal member is prevented from projecting by said seal-retaining member when said plug member rotates and said seal member crosses said first passage.

11. The plug valve according to claim 10, wherein slits or holes for communicating with said first opening are provided in said seal-retaining member.

12. The plug valve according to claim 11, wherein said slits or said holes are provided in a curved surface of said seal-retaining member conforming to said outer circumferential surface of said plug member.

13. The plug valve according to claim 11, wherein said seal-retaining member is disposed so that said slits or holes are arranged in a direction substantially perpendicular to an axial direction of said plug member.

* * * * *